US012392969B2

(12) United States Patent
Lu et al.

(10) Patent No.: US 12,392,969 B2
(45) Date of Patent: Aug. 19, 2025

(54) RUGGEDIZED PUSH-PULL FIBER OPTIC CONNECTION SYSTEMS

(71) Applicant: COMMSCOPE TECHNOLOGIES LLC, Hickory, NC (US)

(72) Inventors: Yu Lu, Eden Prairie, MN (US); Ryan Kostecka, Waconia, MN (US); Patrick Jacques Ann Diepstraten, Beringen (BE)

(73) Assignee: CommScope Technologies LLC, Claremont, NC (US)

(*) Notice: Subject to any disclaimer, the term of this patent is extended or adjusted under 35 U.S.C. 154(b) by 222 days.

(21) Appl. No.: 17/916,480

(22) PCT Filed: Apr. 2, 2021

(86) PCT No.: PCT/US2021/025599
§ 371 (c)(1),
(2) Date: Sep. 30, 2022

(87) PCT Pub. No.: WO2021/203012
PCT Pub. Date: Oct. 7, 2021

(65) Prior Publication Data
US 2023/0152530 A1    May 18, 2023

Related U.S. Application Data

(60) Provisional application No. 63/004,400, filed on Apr. 2, 2020, provisional application No. 63/089,678, filed on Oct. 9, 2020.

(51) Int. Cl.
*G02B 6/38* (2006.01)

(52) U.S. Cl.
CPC ......... *G02B 6/3825* (2013.01); *G02B 6/3831* (2013.01); *G02B 6/3849* (2013.01);
(Continued)

(58) Field of Classification Search
CPC ....................................................... G02B 6/38
(Continued)

(56) References Cited

U.S. PATENT DOCUMENTS 7,467,896 B2 * 12/2008 Melton ............... G02B 6/4433
385/86
7,744,288 B2 *  6/2010 Lu ...................... G02B 6/3887
385/60

(Continued)

FOREIGN PATENT DOCUMENTS

CN       108318975 A    7/2018
CN       109239857 A    1/2019
(Continued)

OTHER PUBLICATIONS

Extended European Search Report for European Patent Application No. 21781363.3 mailed Feb. 21, 2024, 7 pages.
(Continued)

*Primary Examiner* — Kaveh C Kianni
(74) *Attorney, Agent, or Firm* — Merchant & Gould P.C.

(57) ABSTRACT

The present disclosure relates to ruggedized push-pull fiber optic connection system. The fiber optic connection system includes a push-pull connector that is adapted to be latched within and sealed with respect to a connector port.

24 Claims, 9 Drawing Sheets

(52) U.S. Cl.
CPC .......... *G02B 6/3891* (2013.01); *G02B 6/3893* (2013.01); *G02B 6/3897* (2013.01)

(58) Field of Classification Search
USPC .......................................................... 385/76
See application file for complete search history.

(56) References Cited

U.S. PATENT DOCUMENTS

| | | | |
|---|---|---|---|
| 8,556,520 B2 | 10/2013 | Elenbaas et al. | |
| 9,733,436 B2* | 8/2017 | Van Baelen | G02B 6/38875 |
| 11,215,768 B2* | 1/2022 | Rosson | G02B 6/3873 |
| 2009/0148104 A1* | 6/2009 | Lu | G02B 6/3877 |
| | | | 385/72 |
| 2011/0123157 A1* | 5/2011 | Belsan | G02B 6/4292 |
| | | | 439/523 |
| 2011/0211792 A1* | 9/2011 | Koreeda | G02B 6/3879 |
| | | | 385/60 |
| 2011/0229098 A1* | 9/2011 | Abernathy | G02B 6/4427 |
| | | | 385/102 |
| 2016/0131857 A1* | 5/2016 | Pimentel | G02B 6/3897 |
| | | | 385/78 |
| 2016/0139346 A1* | 5/2016 | Bund | G02B 6/44528 |
| | | | 385/56 |
| 2016/0209599 A1* | 7/2016 | Van Baelen | G02B 6/38875 |
| 2017/0153398 A1* | 6/2017 | Compton | G02B 6/389 |
| 2019/0041587 A1 | 2/2019 | Waldron et al. | |
| 2019/0137697 A1 | 5/2019 | Jensen et al. | |
| 2019/0384017 A1 | 12/2019 | Lu | |
| 2020/0064561 A1* | 2/2020 | Alrutz | G02B 6/3891 |
| 2021/0041641 A1* | 2/2021 | Hu | G02B 6/389 |
| 2021/0382248 A1* | 12/2021 | Newbury | G02B 6/3878 |
| 2022/0120989 A1* | 4/2022 | Takeuchi | G02B 6/44528 |

FOREIGN PATENT DOCUMENTS

| | | |
|---|---|---|
| WO | 2018/065293 A1 | 4/2018 |
| WO | 2019/006195 A1 | 1/2019 |
| WO | 2019/246241 A1 | 12/2019 |
| WO | 2020/167779 A1 | 8/2020 |
| WO | 2020/236512 A1 | 11/2020 |
| WO | 2021/041305 A1 | 3/2021 |

OTHER PUBLICATIONS

International Search Report and Written Opinion of the International Searching Authority for International Patent Application No. PCT/US2021/025599 mailed Jul. 27, 2021, 11 pages.

* cited by examiner

RUGGEDIZED PUSH-PULL FIBER OPTIC CONNECTION SYSTEMS

CROSS-REFERENCE TO RELATED APPLICATIONS

This application is a National Stage Application of PCT/US2021/025599, filed on Apr. 2, 2021, which claims the benefit of U.S. Patent Application Ser. No. 63/004,400, filed on Apr. 2, 2020, and claims the benefit of U.S. Patent Application Ser. No. 63/089,678, filed on Oct. 9, 2020, the disclosures of which are incorporated herein by reference in their entireties. To the extent appropriate, a claim of priority is made to each of the above disclosed applications.

TECHNICAL FIELD

The present disclosure relates generally to fiber optic connectors. More particularly, the present disclosure relates to fiber optic connectors suitable for outside environmental use.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of an intermediate fiber optic adapter.

Ruggedized (i.e., hardened) fiber optic connection systems include fiber optic connectors and fiber optic adapters suitable for outside environmental use. These types of systems are typically environmentally sealed and include robust fastening arrangements suitable for withstanding relatively large pull loading and side loading. Example ruggedized fiber optic connection systems are disclosed by U.S. Pat. Nos. 7,467,896; 7,744,288 and 8,556,520.

SUMMARY

Certain aspects of the present disclosure relate to ruggedized push-pull connection systems. One example push-pull connection system includes connector sealing at a location inwardly positioned within a connector port with respect to a push-pull latching arrangement for latching a fiber optic connector in the connector port. Another example push-pull connection system includes a fiber optic connector with an integral latch for latching the connector within a connector port, and also includes sealing on the inside and the outside of a release sleeve of the fiber optic connector.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

DETAILED DESCRIPTION

The expansion of fiber optic networks toward the premises has driven the demand for enhanced fiber optic connectors suitable for outside environmental uses. For example, in a given fiber optic network, outside fiber optic connectors are used to connect fiber optic cables to structures such as drop terminals (i.e., multi-service terminals), optical network terminals (ONTs), breakout locations on fiber optic cables, fiber distribution hubs, splice closures, pedestals, or other structures. Effective use of fiber optic connectors in outside environments requires the fiber optic connectors to be sealed against the environment and to have robust designs that can withstand relatively large temperature variations, large pulling loads, and significant side loading. It is also desirable for such connectors to be relatively easy to insert and remove from a port in a structure of the type described above. The present disclosure describes various connectors having rugged, robust designs that are environmentally sealed and that are relatively easy to install and uninstall in the field.

Figure 1:
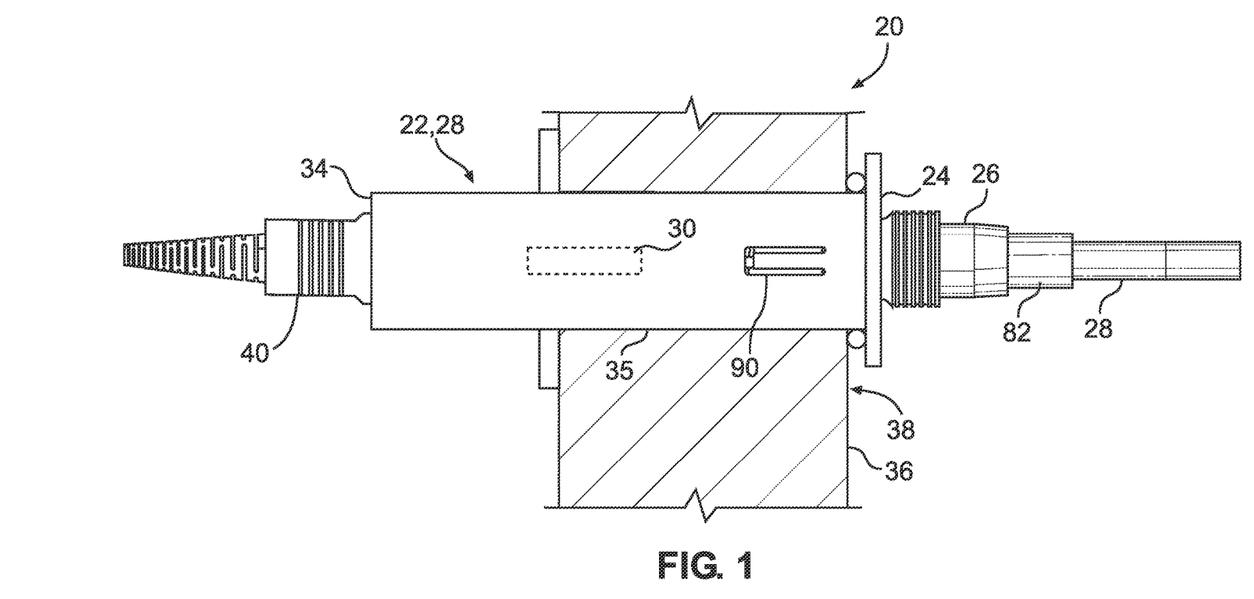
FIG. 1 depicts an example push-pull fiber optic connection system in accordance with the principles of the present disclosure.

FIG. 1 depicts an example push-pull fiber optic connection system 20 in accordance with the principles of the present disclosure. The push-pull fiber optic connection system 20 includes a structure 22 defining a connector port 24. The push-pull fiber optic connection system 20 also includes a push-pull fiber optic connector 26 adapted to be latched and sealed within the connector port 24 via a push-pull latching arrangement. The latching arrangement is configured to latch the push-pull fiber optic connector 26 within the connector port 24 when the connector 26 is pushed into the connector port 24 and to unlatch the connector 26 with respect to the connector port 24 when the connector 26 is pulled from the connector port 24 (e.g., by grasping and pulling on a release sleeve 50 of the connector 26). In one example, the push-pull latching arrangement allows for single-handed installation of the connector 26 in the connector port 24 and single-handed disengagement of the connector 26 from the connector port 24.

Figure 3:
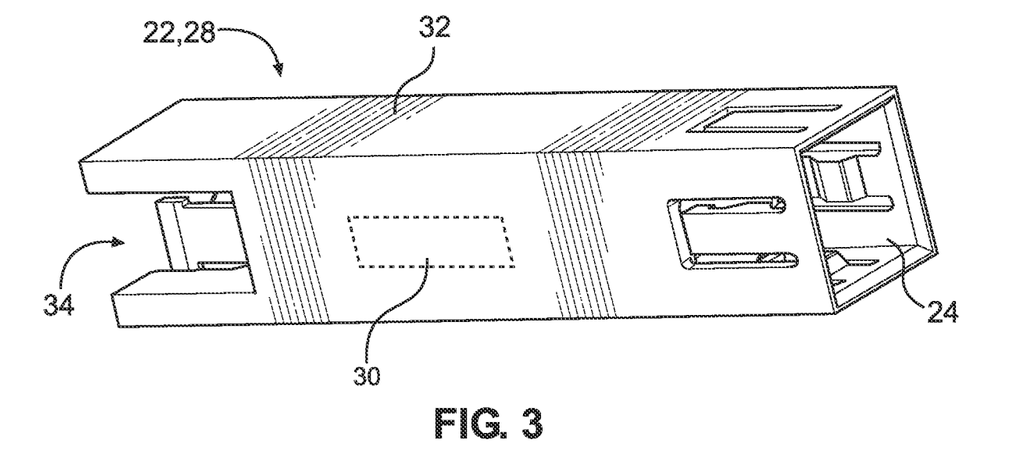
FIG. 3 depicts an example fiber optic adapter of the push-pull fiber optic connection system of FIG. 1.

Referring to FIGS. 1 and 3, the structure 22 defining the connector port 24 is depicted as a fiber optic adapter 28. A fiber optic adapter is a structure for mechanically and optically coupling two fiber optic connectors together. A fiber optic adapter often includes a ferrule alignment sleeve (e.g., see sleeve 30) for co-axially aligning the ferrules of two fiber optic connectors inserted within opposite ports of the fiber optic adapter. A fiber optic adapter can include an adapter housing that defines the connector ports. The adapter housing can include one or more parts.

In other examples, one or more connector ports of a fiber optic adapter can be defined by structures other than adapter housings. For example, one or both of the connector ports of a fiber optic adapter can be defined directly in the wall of an enclosure. Fiber optic connectors received in fiber optic adapters include single fiber connectors, multi-fiber connectors, ruggedized fiber optic connectors, non-ruggedized connectors (e.g., SC connectors, LC connectors, MPO connectors, etc.), and simplified fiber optic connectors which in certain cases may include only a ferrule.

Referring to FIGS. 1 and 3, the fiber optic adapter 28 includes an adapter housing 32 having the connector port 24 accessible at one end and another connector port 34 accessible at an opposite end. A ferrule alignment sleeve 30 can be mounted within the housing 32 in axial alignment with the connector ports 24, 34. The adapter 28 can be mounted in a sealed manner within an opening 35 defined through a wall 36 of an enclosure 38. For example, the structure 22 may include a flange to compress a seal (e.g., a radial seal) against an exterior of the wall 36. A nut or other fastener may be mounted to the structure 22 at the opposite side of the wall 36. In certain examples, the body of the structure may include a rounded portion defining threads over which the fastener may tighten. As so mounted, the connector port 24 is accessible from outside the enclosure 38 and the connector port 34 is located at an interior of the enclosure 38.

As depicted at FIG. 1, a fiber optic connector 40 is secured within the connector port 34 and is positioned such that the fiber optic connector 26 optically couples with the connector 40 when the fiber optic connector 26 is latched within the connector port 24. In one example, the connector 40 has a ferrule received in one end of the ferrule alignment sleeve 30 and the connector 26 includes a ferrule 42 that is received in an opposite end of the sleeve 30 when the connector 26 is latched in the connector port 24.

Figure 2:
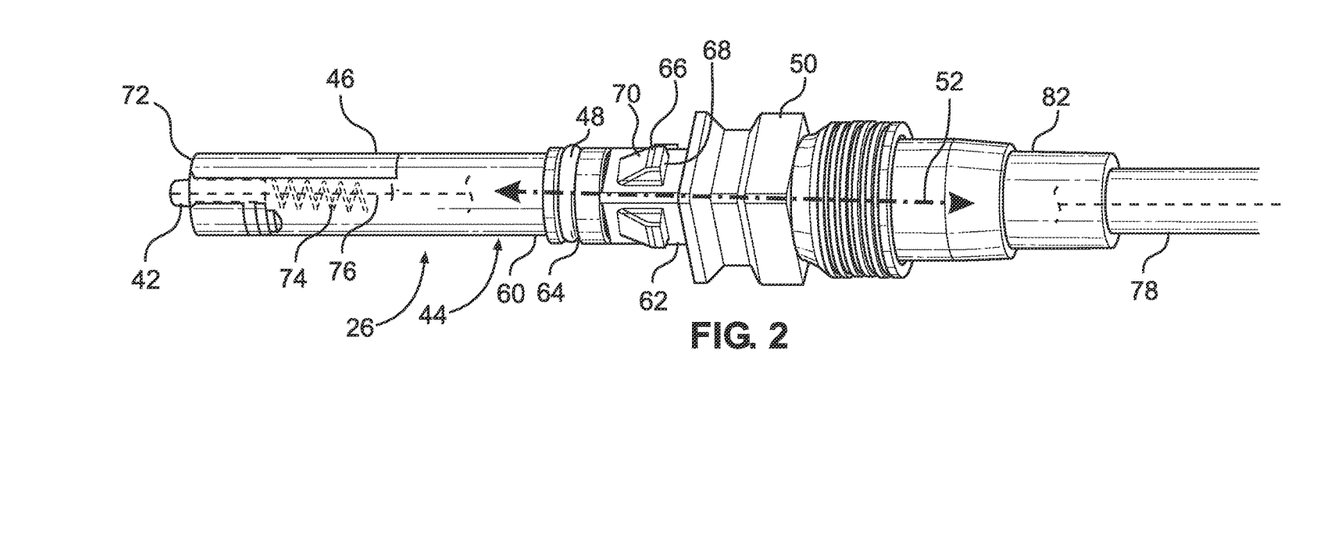
FIG. 2 depicts an example push-pull fiber optic connector of the push-pull fiber optic connection system of FIG. 1.

Referring to FIG. 2, the fiber optic connector 26 includes a connector body 44 defining a plug portion 46 sized and shaped for insertion into the connector port 24. The fiber optic connector 26 includes a port seal 48 on the connector body 44 for sealing within the connector port 24 (e.g., against a surface defining the connector port 24) when the fiber optic connector 26 is inserted in the connector port 24. The fiber optic connector 26 also including a release sleeve 50 that is axially moveable relative to the connector body 44 along an axis 52 of the connector 26.

The fiber optic connection system 20 includes a latching arrangement for securing the fiber optic connector 26 within the connector port 24. The latching arrangement is configured to automatically latch the connector body 44 within the connector port 24 when the fiber optic connector 26 is pushed into the connector port 24 in an inward axial direction 54. The latching arrangement also is configured to unlatch when the release sleeve 50 is pulled in an outward axial direction 56 while the connector body 44 is latched within the connector port 24 to allow the fiber optic connector 26 to be withdrawn in the outward axial direction 56 (FIG. 5) from the connector port 24. The port seal 48 is located inwardly within the connector port 24 with respect to the latching arrangement when the connector body 44 is latched within the connector port 24.

The plug portion 46 of the connector body 44 includes a first region 60 defining a round transverse cross-sectional profile and a second region 62 defining a polygonal (e.g., depicted as square) transverse cross-sectional profile. The adapter 28 preferably includes an inner passage with a cross-sectional profile that complements the outer shape of the plug portion of the connector body 44. The port seal 48 is depicted as a radial seal than mounts within a circumferential groove 64 defined at the first region 60 of the plug portion 46. The latching arrangement includes latch catches 66 provided at sides of the polygonal transverse cross-section profile of the second region 62. Preferably, at least 2, 3 or 4 latch catches are provided. Each latch catch 66 includes a retention surface 68 and a ramp surface 70. The seal 48 is mounted axially between the second region 62 and a plug end 72 of the connector body 44. The fiber optic connector 26 includes the ferrule 42 which is located at the plug end 72 and can be spring biased relative to the connector body 44 by a spring 74. The ferrule 42 supports one or more optical fibers 76 corresponding to a fiber optic cable 78 anchored to a cable anchoring end of the connector body 44. The connector body 44 can be formed by one or more connector body pieces. The cable 78 can be anchored to the connector body 44 by a crimp, adhesive or the like. As depicted, a shape memory sleeve 82 (e.g., a heat shrink sleeve) containing adhesive is used to secure the cable 78 to the connector body 44 and to provide a seal between the cable 78 and the cable anchoring end of the connector body 44.

Figure 4:
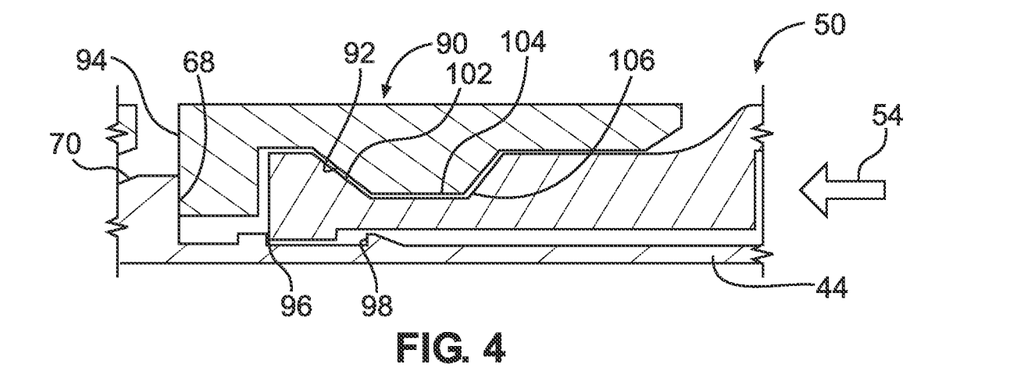
FIG. 4 depicts an example push-pull latching arrangement of the push-pull fiber optic connection system of FIG. 1, the latching arrangement being depicted in a latched state.

The latching arrangement also includes resilient latches 90 that are biased by their own inherent elasticity toward a latching position (see FIG. 4). The latches are adapted to engage the retention surfaces 68 of the latch catches 66 to latch the connector 26 within the connector port 24 (see FIG. 4). The latches 90 are provided at the connector port 24. In one example, the latches 90 are integral with the adapter housing. Each of the latches includes a ramp surface 92 and a retention surface 94.

The release sleeve 50 is axially moveable relative to the connector body 44. A range of axial movement of the release sleeve 50 is limited by a stop arrangement including stops 96, 98 provided on the connector body 44 between which a stop 100 of the release sleeve 50 is captured. The sleeve 50 is axially moveable between an extended position (see FIG. 4) and a retracted position (see FIG. 5). The release sleeve 50 includes a ramp surface 102. The latches 90 have projections 104 that fit in recesses 106 defined by the sleeve 50 when the latches are in the latching position and the release sleeve 50 is in the extend position. The projections 104 can retain the release sleeve 50 in the extended position when the connector 26 is latched within the connector port 24.

Figure 5:
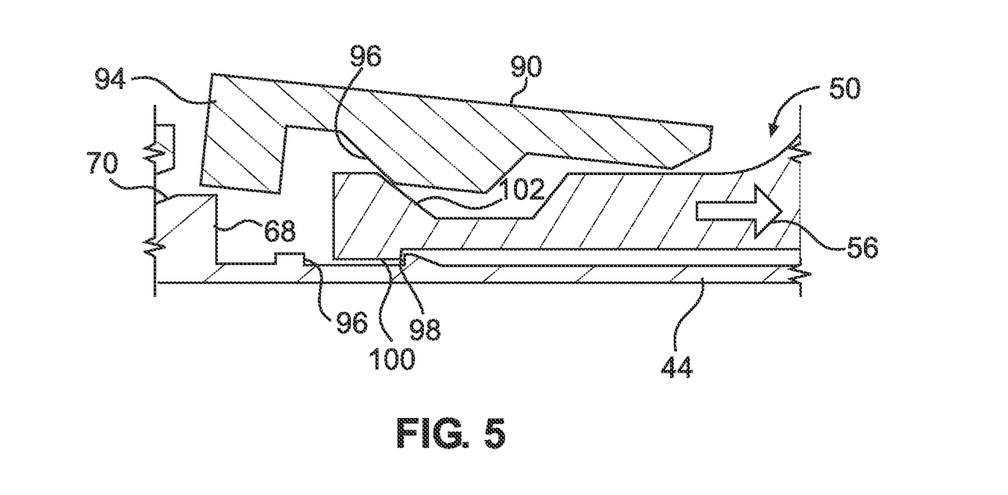
FIG. 5 depicts the push-pull latching arrangement of FIG. 4 in an unlatched state.
Figure 6:
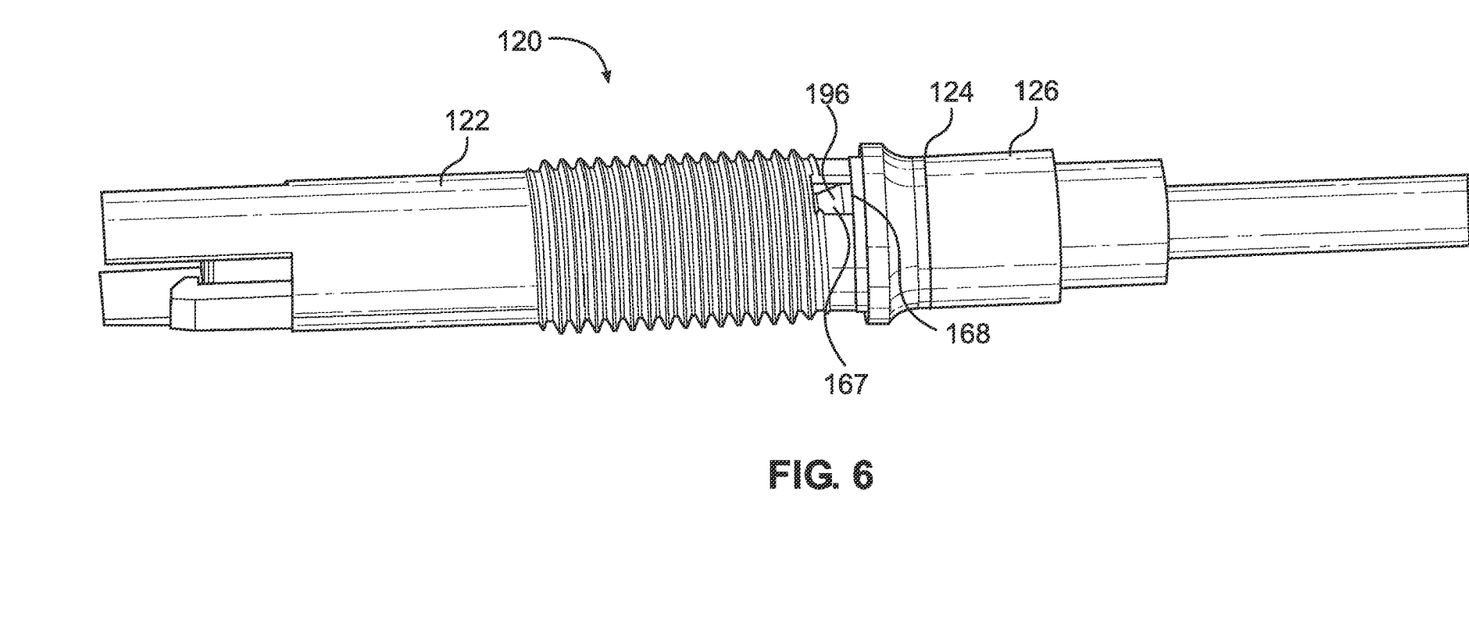
FIG. 6 depicts another example push-pull fiber optic connection system in accordance with the principles of the present disclosure.
Figure 7:
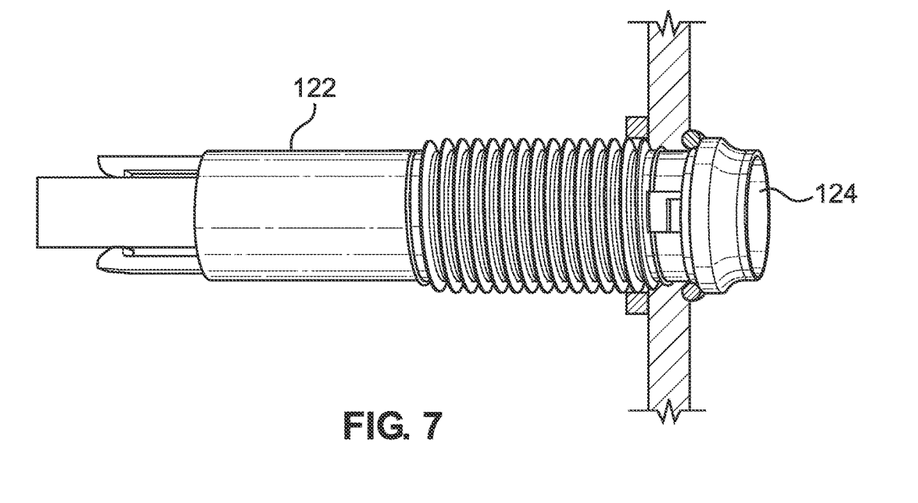
FIG. 7 depicts an example fiber optic adapter of the push-pull fiber optic connection system of FIG. 6.
Figure 8:
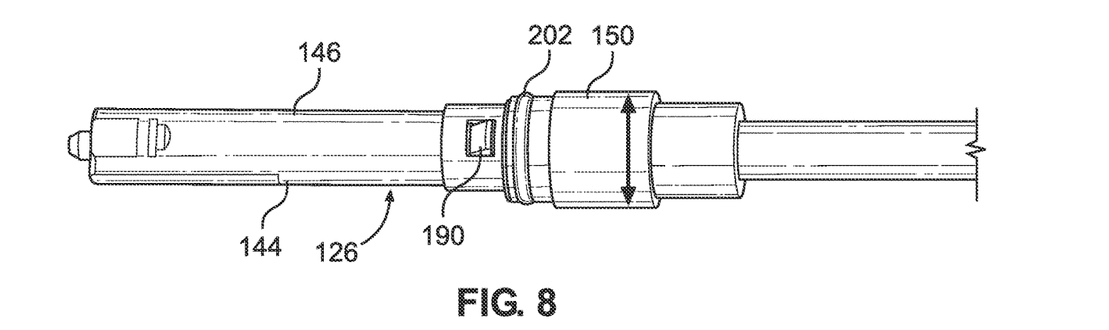
FIG. 8 depicts an example push-pull fiber optic connector of the push-pull fiber optic connection system of FIG. 6.
Figure 9:
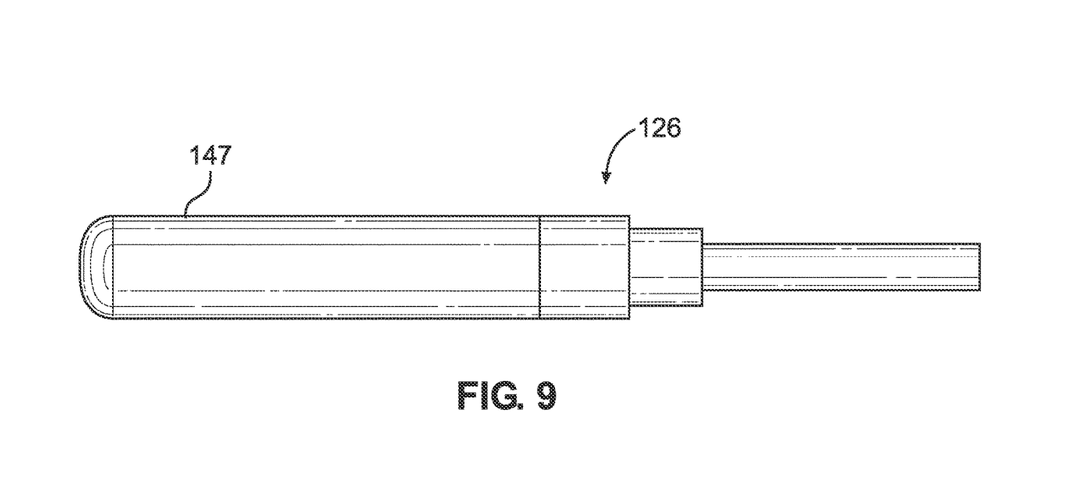
FIG. 9 depicts the push-pull fiber optic connector of FIG. 8 with a dust cap installed over a plug end of the fiber optic connector.

When the connector 26 is pushed into the connector port 24 in the inward axial direction 54, the ramp surfaces 70 of the latch catches 66 engage the latches 90 to flex the latches outwardly from the latching state of FIG. 4 to the unlatching state of FIG. 5. Contact between the surface 70 and the latches 90 allows the latch catches 66 to move inwardly past the latches 90. Once the retention surfaces 68 of the latch catches 66 move past the retention surfaces 94 of the latches 90, the latches resiliently return to the latching position of FIG. 4. In the latching position of FIG. 4, the retention surfaces 68, 94 oppose each other such that the connector body 44 is latched within the connector port 24. Also, the projections 104 fit within the recesses 106 and the ramp surfaces 92, 102 oppose each other. The sleeve 50 is in the extended position when the connector 26 is latched within the port 24.

To remove the connector 26 from the port 24, the release sleeve 50 is pulled in the outward axial direction 56 to move the release sleeve 50 axially relative to the connector body 44 from the extended position to the retracted position. As the release sleeve 50 is pulled from the extended position to the retracted position, the ramp surfaces 102 engage the ramp surfaces 92 to cause the latches 90 to flex from the latching state to the unlatched state. In the unlatched state, the stop surface 94, 68 do not oppose or interfere with one another such that the connector 26 can be withdrawn without interference from the latches 90. Once the connector 26 is withdrawn, the latches 90 resiliently return to the latching state.

FIGS. 6-11 depict another push-pull fiber optic connection system 120 in accordance with the principles of the present disclosure. The system includes structure 122 (e.g., an adapter, see FIGS. 6 and 7) defining a connector port 124. The system 120 also includes a fiber optic connector 126 (see FIGS. 6 and 8) including a connector body 144 defining a plug portion 146 sized and shaped for insertion into the connector port 124. The fiber optic connector 126 also including a release sleeve 150 that is axially moveable relative to the connector body 144. The plug portion 146 can be temporarily protected by a dust cap 147 prior to insertion in the connector port 124 (see FIG. 9). Similar to the previous example, the structure 122 can be secured within an opening defined by a wall of an enclosure and can be sealed with respect to the enclosure at an outer surface of the enclosure by an o-ring or other type of seal (e.g., a seal can be compressed between the outer surface of the enclosure and an outer flange of the structure 122).

Figure 10:
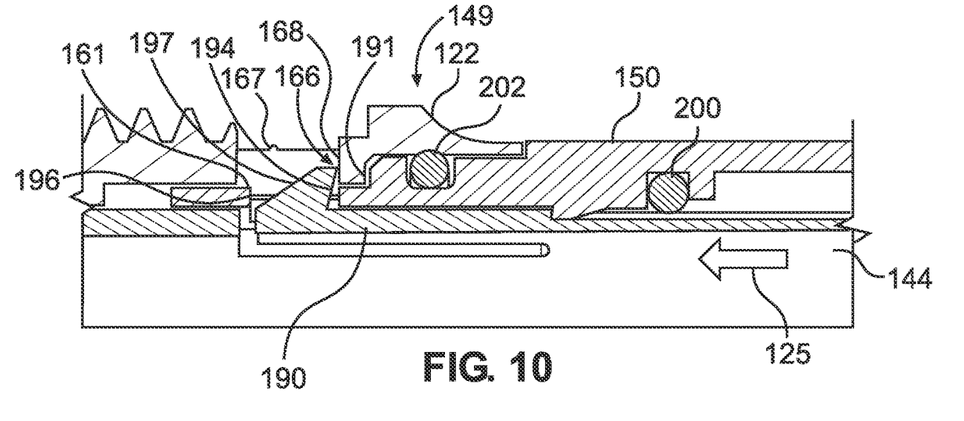
FIG. 10 depicts an example push-pull latching arrangement of the push-pull fiber optic connection system of FIG. 6, the latching arrangement being depicted in a latched state.

A latching arrangement 149 is provided for securing the fiber optic connector 126 in the connector port 124. The latching arrangement 149 is configured to automatically latch the connector body 144 within the connector port 124 when the fiber optic connector 126 is pushed into the connector port 124 in an inward axial direction 125 (FIG. 10). FIG. 10 shows the latching arrangement 149 in the latching/latched state. The latching arrangement 149 is configured to unlatch when the release sleeve 150 is pulled in an outward axial direction 127 (FIG. 11) while the connector body 144 is latched within the connector port 124 to allow the fiber optic connector 126 to be withdrawn in the outward axial direction 127 from the connector port 124.

Figure 11:
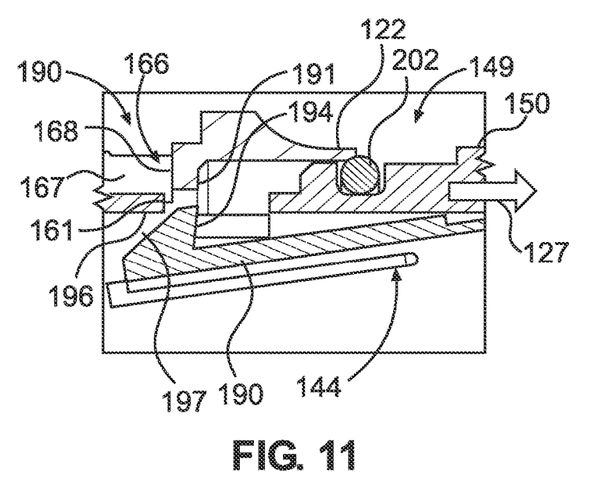
FIG. 11 depicts the push-pull latching arrangement of FIG. 10 in an unlatched state.

The release sleeve 150 is axially moveable relative to the connector body 144 between an extended position (see FIG. 10) and a retracted position (see FIG. 11). A stop arrangement can be used to limit a range of axial travel of the release sleeve 150. The latching arrangement 149 includes resilient latches 190 integrated with the connector body 144 and latch catches 166 provided at the connector port 124. It will be appreciated that similar latch catches 166 can be provided in the dust cap 147 for securing the fiber optic connector 126 to the dust cap 147 by a push-pull connection. The latches 190 engage the latch catches 166 to retain the connector body 144 in the connector port 124. The latch catches 166 are defined by openings 167 through the surface defining the connector port 124, and include retention surfaces 168. The latches 190 include retention surfaces 194 that oppose the retention surfaces 168 when the connector body 144 is latched in the connector port 124. The release sleeve 150 defines openings 161 through which the retention surfaces 194 extend when the connector body 144 is latched in the connector port 124. Release surfaces 196 are provided on the release sleeve 150 at the openings 161. The release surfaces 196 oppose ramp surfaces 197 of the latches 190 when the connector body 144 is latched in the connector port 124. The release sleeve 150 is in the extend position when the connector 126 is latched within the connector port 124.

A first seal 200 is provided for sealing between the connector body 144 and the release sleeve 150. A second seal 202 is provided for sealing between the structure defining the connector port 124 and the release sleeve 150 when the fiber optic connector 126 is latched within the connector port 124. The second seal 202 seals against the structure defining the connector port 124 at a position located outside the latching arrangement 149 when the connector body 144 is latched within the connector port 124. In another example, the seal 202 can be positioned on the connector body 144 inward of the latches 190 so as to be capable of sealing with respect to the connector port 124 at a location inward with respect to the latching arrangement 149.

When the connector 126 is pushed into the connector port 124 in the inward axial direction 125, the ramp surfaces 197 of the latches 190 engage surfaces 191 in the port 124 to cause the latches 190 to flex inwardly from the latching state of FIG. 10 to the unlatching/unlatched state of FIG. 11. This allows the retention surfaces 194 to move inwardly past the retention surface 168. Once the retention surfaces 194 of the latches move past the retention surfaces 168 of the catches 166, the latches resiliently return to the latching position of FIG. 10. In the latching position of FIG. 10, the retention surfaces 168, 194 oppose each other such that the connector body 144 is latched within the connector port 124. Also, retention surfaces 194 extend through the openings 161 of the release sleeve 150 and the release surfaces 196 oppose the ramp surfaces 197. The sleeve 150 is in the extended position when the connector 126 is latched within the port 124.

To remove the connector 126 from the port 124, the release sleeve 150 is pulled in the outward axial direction 127 to move the release sleeve 150 axially relative to the connector body 144 from the extended position to the retracted position. As the release sleeve 150 is pulled from the extended position to the retracted position, the release surfaces 196 engage the ramp surfaces 197 to cause the latches 190 to flex from the latching state (FIG. 10) to the unlatched state (FIG. 11). In the unlatched state, the stop surface 194, 168 do not oppose or interfere with one another such that the connector 126 can be withdrawn without interference between the latches 190 and the retaining surfaces 168. Once the connector 126 is withdrawn, the latches 190 resiliently return to the latching state.

Referring now to FIGS. 12-17, a shroud assembly 210, 230 can be mounted over any of the connectors disclosed herein to enable the connector to mate with a different type of adapter. In FIGS. 12-17, example shroud assemblies are shown with the connector 126 of FIGS. 6-11. In other examples, however, the shroud assemblies can be mounted over the connector 26 or another push-pull fiber optic connector. For example, the shroud assemblies 210, 230 may adapt the connector 126 to form a ruggedized connection with the different type of adapter. As the term is used herein, a "ruggedized connection" refers to an environmentally sealed connection between the connector 126 and the adapter. A "ruggedized connection" also indicates a robust mechanical fastening, such as a twist-to-lock connection (e.g., a bayonet or threaded type connection) or a robust snap-fit connection, between the connector 126 and the adapter.

The shroud assembly 210, 230 defines a through-passage extending between opposite first and second open ends of the shroud 210, 230. The through-passage is sized to receive at least the plug portion 146 of the connector body 144. In particular, the plug portion 146 is inserted into the through-passage through the open first end 212, 232. The plug portion 146 extends through the shroud 210, 230 so that a ferrule tip of the plug portion 146 is accessible at the second end 214, 234 of the through-passage. The shroud assembly 210, 230 includes a mechanical securement structure 224, 244 to hold the shroud assembly 210, 230 to an adapter. In one example, the mechanical securement structure 224, 244 includes a twist to lock connection such as a bayonet or threaded type connection.

The shroud assembly 210, 230 also is configured to engage the connector 126 to retain at least a portion of the shroud assembly 210, 230 on the connector 126 in a fixed axial position. In certain examples, the latches 190 of the connector 126 are disposed within the through-passage when the shroud assembly 210, 230 is mounted over the connector 126 (e.g., see FIGS. 14 and 17). The latches 190 snap-fit over catch surfaces 220, 240 at a rearward end of the shroud assembly 210, 230 to axially retain the shroud assembly 210, 230 on the connector 126.

In certain implementations, the second seal 202 of the connector 126 also is disposed within the through-passage of the shroud 210, 230. The shroud assembly 210, 230 defines a seal engagement surface 222, 242 that engages the second seal 202 when the shroud assembly 210, 230 is mounted over the connector 126.

Figure 12:
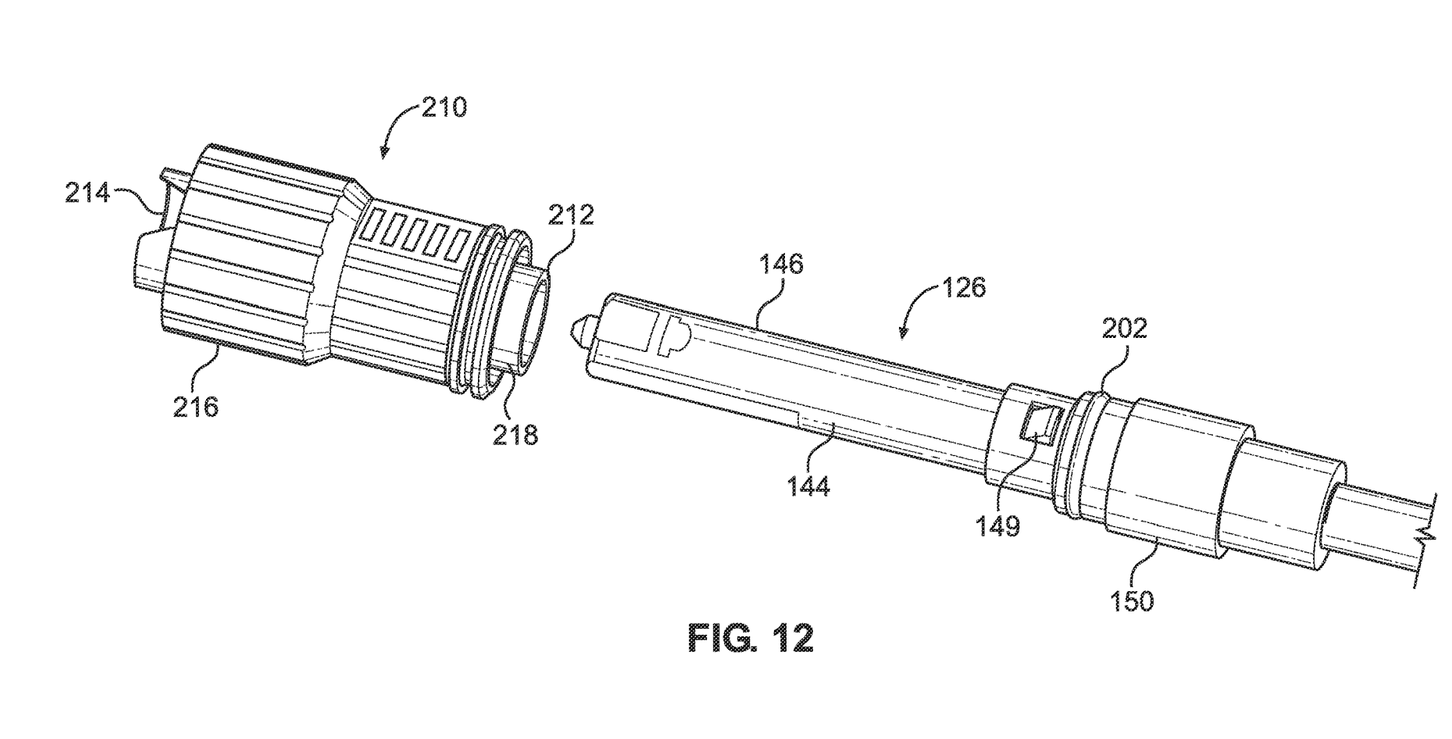
FIG. 12 depicts a first type of shroud being mounted over the push-pull connector of FIGS. 6-11.
Figure 13:
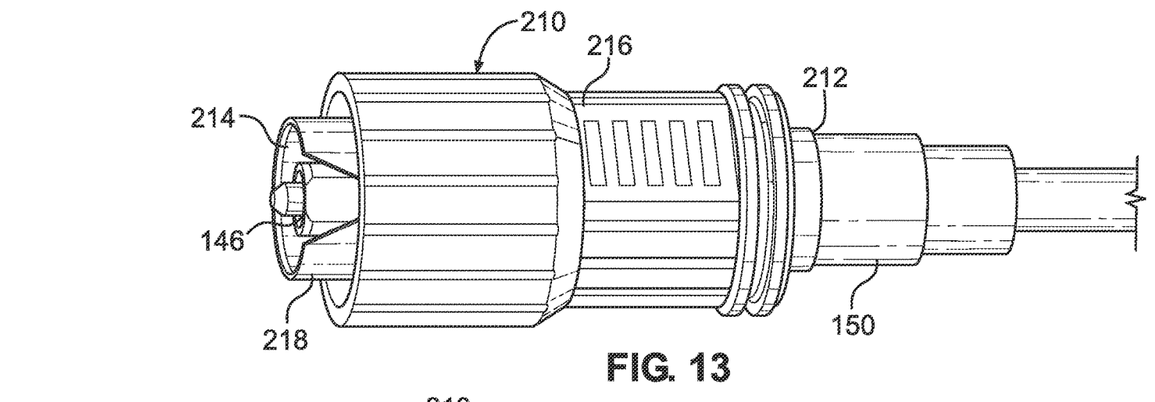
FIG. 13 depicts the first type of shroud assembled on the connector of FIGS. 6-11 to form a first type of ruggedized connector.
Figure 14:
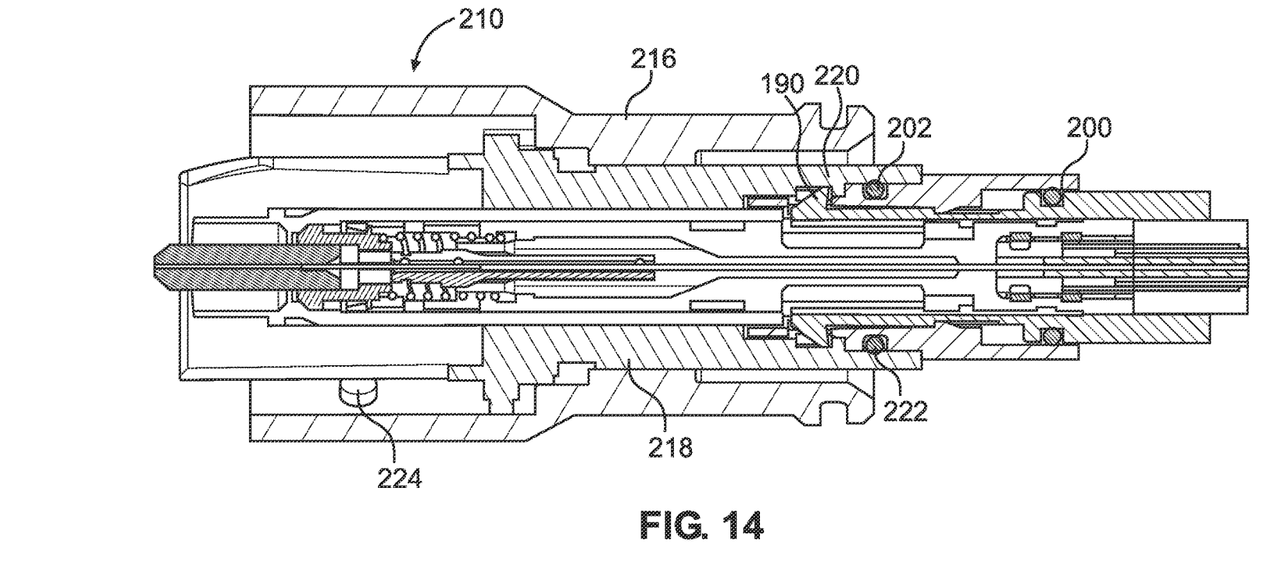
FIG. 14 is an axial cross-section of the first type of ruggedized connector of FIG. 13.

FIGS. 12-14 illustrate a first type of shroud assembly 210 being utilized in connection with the connector 126. The first shroud assembly 210 has an outer housing 216 and an inner housing 218 that are axially and rotationally movable relative to each other. The outer housing 216 carries the securement structure 224. In the example shown in FIG. 14, the mechanical securement structure 224 of the first shroud 210 includes a bayonet pin configured to slide along a retention slot defined by the corresponding adapter. The inner housing 218 of the first shroud 210 defines the catch surfaces 220 for the connector latch 190. The inner housing 218 also defines the seal engagement surface 222. In certain implementations, the inner housing 218 can include notches, extensions, or the like for providing keying and/or intermateability with respect to the corresponding adapter. For example, such notches and/or extensions can be disposed at the second end 214 of the shroud 210.

Figure 15:
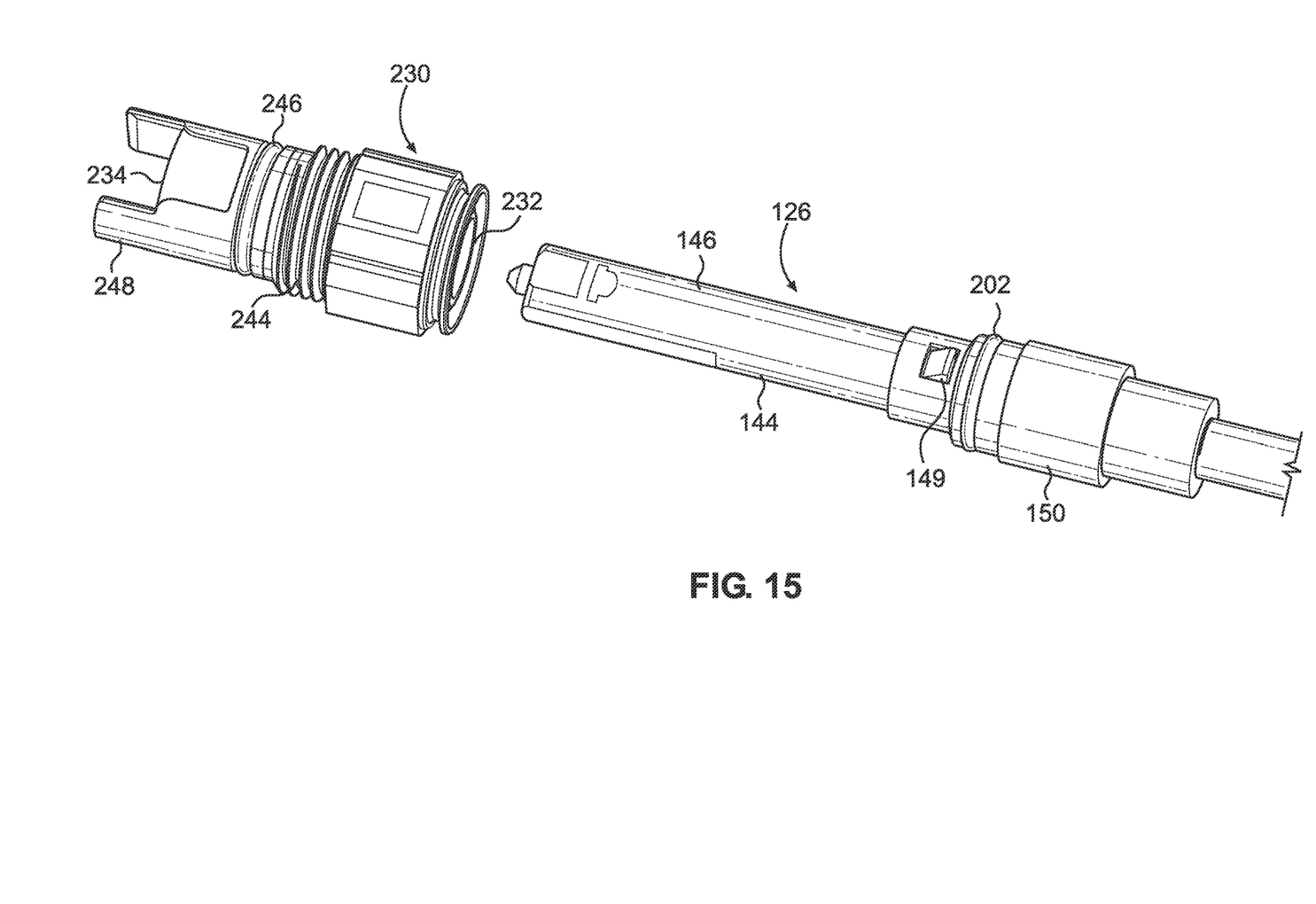
FIG. 15 depicts a second type of shroud being mounted over the push-pull connector of FIGS. 6-11.
Figure 16:
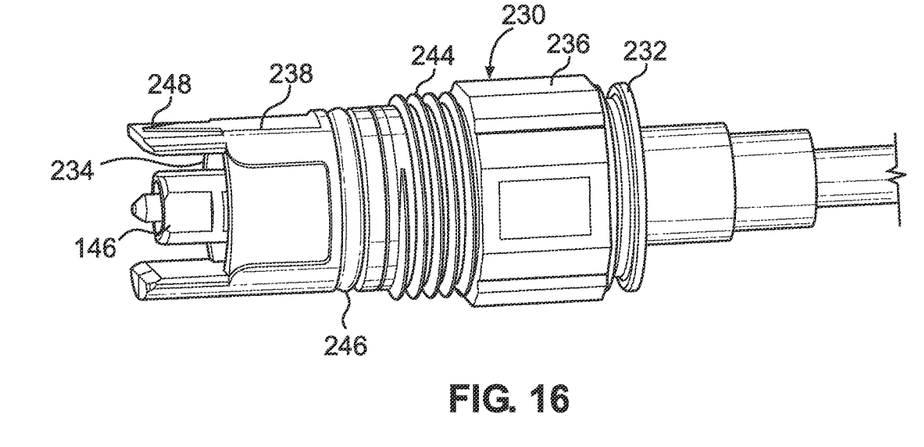
FIG. 16 depicts the second type of shroud assembled on the connector of FIGS. 6-11 to form a second type of ruggedized connector.
Figure 17:
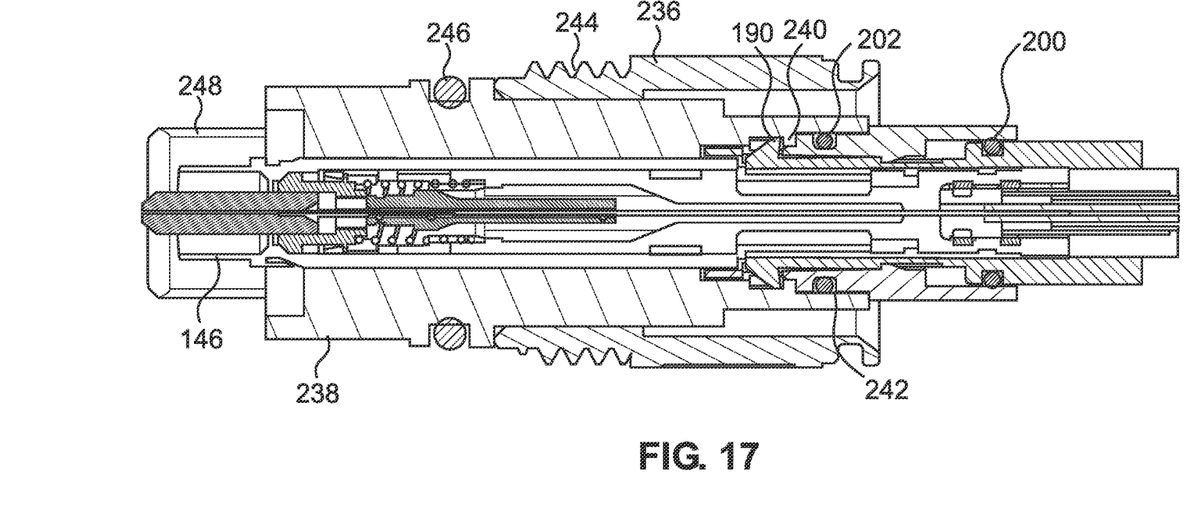
FIG. 17 is an axial cross-section of the second type of ruggedized connector of FIG. 16.

FIGS. 15-17 illustrate a second type of shroud assembly 230 being utilized in connection with the connector 126. The second shroud assembly 230 has an outer housing 236 and an inner housing 238 (e.g., see FIG. 16). The outer housing 236 of the second shroud assembly 230 includes a fastener that is axially and rotatably movable relative to the inner housing 238. The inner housing 238 of the second shroud 230 defines the catch surfaces 240 for the connector latch 190. The inner housing 238 also defines the seal engagement surface 242.

The outer housing 236 carries the securement structure 244. In the example shown in FIG. 16, the mechanical securement structure 244 of the second shroud 230 includes outwardly facing threads configured to mate with inwardly facing threads of the corresponding adapter. In other examples, the threads 244 of the second shroud 230 can be inwardly facing instead. In certain examples, the inner housing 238 carries an outer seal 246 that seals to the adapter. In certain examples, the inner housing 238 defines extensions 248 to protect the end face of the connector 126.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A push-pull connector system comprising:
   structure defining a connector port;
   a fiber optic connector including a connector body defining a plug portion sized and shaped for insertion into the connector port, the fiber optic connector also including a release sleeve that is axially moveable relative to the connector body; and
   a latching arrangement for securing the fiber optic connector within the connector port, the latching arrangement being configured to automatically latch the connector body within the connector port when the fiber optic connector is pushed into the connector port in an inward axial direction, the latching arrangement being configured to unlatch when the release sleeve is pulled in an outward axial direction while the connector body is latched within the connector port to allow the fiber optic connector to be withdrawn in the outward axial direction from the connector port, the latching arrangement including a latch integrated with the connector body and a latch catch provided at the connector port; and
   a first seal for providing sealing between the connector body and the release sleeve and a second seal for providing sealing between the structure defining the connector port and the release sleeve when the fiber optic connector is latched within the connector port.

2. The push-pull connector system of claim 1, wherein the second seal seals against the structure defining the connector port at a position located outside the latching arrangement when the connector body is latched within the connector port.

3. The push-pull connector system of claim 1, wherein the structure includes an optical adapter.

4. The push-pull connector system of claim 1, further comprising a shroud for adapting the fiber optic connector to secure to a ruggedized optical adapter.

5. The push-pull connector system of claim 4, wherein the shroud has a bayonet type securement arrangement to secure the shroud to the ruggedized optical adapter.

6. The push-pull connector system of claim 4, wherein the shroud has threads to secure the shroud to the ruggedized optical adapter.

7. The push-pull connector system of claim 4, wherein the shroud includes an outer housing and an inner housing that are axially and rotationally movable relative to each other, the outer housing carrying a securement structure to secure the shroud to the ruggedized optical adapter.

8. The push-pull connector system of claim 7, wherein the securement structure includes a bayonet pin configured to slide along a retention slot defined by the ruggedized optical adapter.

9. The push-pull connector system of claim 7, wherein the inner housing defines the latch catch.

10. The push-pull connector system of claim 4, wherein the shroud includes an outer housing and an inner housing, the outer housing including a fastener that is axially and rotatably movable relative to the inner housing.

11. The push-pull connector system of claim 10, wherein the inner housing defines the latch catch and a seal engagement surface.

12. The push-pull connector system of claim 10, wherein the inner housing carries an outer seal that seals to the connector port.

13. The push-pull connector system of claim 1, wherein at least one of the release sleeve and the latching arrangement includes a ramp surface for moving the latching arrangement from the latching position to the unlatched position when the release sleeve is pulled in the outward axial direction while the connector body is latched in the connector port.

14. A push-pull connector system comprising:
structure defining a connector port;
a fiber optic connector including a connector body defining a plug portion sized and shaped for insertion into the connector port, the fiber optic connector also including a release sleeve that is axially moveable relative to the connector body;
a latching arrangement for securing the fiber optic connector within the connector port, the latching arrangement being configured to automatically latch the connector body within the connector port when the fiber optic connector is pushed into the connector port in an inward axial direction, the latching arrangement being configured to unlatch when the release sleeve is pulled in an outward axial direction while the connector body is latched within the connector port to allow the fiber optic connector to be withdrawn in the outward axial direction from the connector port, the latching arrangement including a latch integrated with the connector body and a latch catch provided at the connector port;
a first seal for providing sealing between the connector body and the release sleeve and a second seal for providing sealing between the structure defining the connector port and the release sleeve when the fiber optic connector is latched within the connector port; and
a shroud for adapting the fiber optic connector to secure to a ruggedized optical adapter.

15. The push-pull connector system of claim 14, wherein the second seal seals against the structure defining the connector port at a position located outside the latching arrangement when the connector body is latched within the connector port.

16. The push-pull connector system of claim 14, wherein the structure includes an optical adapter.

17. The push-pull connector system of claim 14, wherein the shroud has a bayonet type securement arrangement to secure the shroud to the ruggedized optical adapter.

18. The push-pull connector system of claim 14, wherein the shroud has threads to secure the shroud to the ruggedized optical adapter.

19. The push-pull connector system of claim 14, wherein the shroud includes an outer housing and an inner housing that are axially and rotationally movable relative to each other, the outer housing carrying a securement structure to secure the shroud to the ruggedized optical adapter.

20. The push-pull connector system of claim 19, wherein the securement structure includes a bayonet pin configured to slide along a retention slot defined by the ruggedized optical adapter.

21. The push-pull connector system of claim 19, wherein the inner housing defines the latch catch.

22. The push-pull connector system of claim 14, wherein the shroud includes an outer housing and an inner housing, the outer housing including a fastener that is axially and rotatably movable relative to the inner housing.

23. The push-pull connector system of claim 22, wherein the inner housing defines the latch catch and a seal engagement surface.

24. The push-pull connector system of claim 22, wherein the inner housing carries an outer seal that seals to the connector port.

* * * * *